United States Patent Office  3,459,556
Patented Aug. 5, 1969

3,459,556
METHOD OF IMPROVING THE FLAVOR OF COCOA- AND CHOCOLATE-FLAVORED MATERIALS
Tatsuo Moroe, Musashino, and Staohiko Hattori, Akira Komatsu, Akira Saito, and Shigeru Muraki, Tokyo, Japan, assignors to Takasago Perfumery Co., Ltd., Tokyo, Japan, a corporation of Japan
No Drawing. Continuation-in-part of application Ser. No. 495,316, Oct. 12, 1965. This application June 27, 1967, Ser. No. 649,101
Claims priority, application Japan, Oct. 17, 1964, 39/58,825
Int. Cl. A23g 1/00; A23l 1/26
U.S. Cl. 99—23                                      1 Claim

ABSTRACT OF THE DISCLOSURE

The flavor of vanillin containing cocoa-flavored and chocolate-flavored material is improved by adding tetramethyl pyrazine in an amount effective to improve their flavor.

---

This application is a continuation-in-part of the copending patent application Ser. No. 493,316, filed Oct. 12, 1965, which is now abandoned.

The present invention relates to flavoring compositions and method of improving the flavor of cocoa- or chocolate-flavored material using pyrazine derivatives and a carbonyl compound.

The characteristic feature of the present invention resides in a method of improving the flavor of a material selected from the group consisting of cocoa-flavored material and chocolate-flavored material and which comprises adding at least one pyrazine derivative represented by the general formula

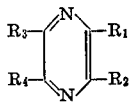

wherein each of $R_1$, $R_2$, $R_3$ and $R_4$ is a member selected from the group consisting of hydrogen and alkyl having 1 to 4 carbon atoms, but both of the side chains adjacent to N do not represent a hydrogen atom at the same time, and a carbonyl compound, such as, vanillin or an aliphatic aldehyde, to said material in an effective amount to improve its flavor.

A further essential feature of the present invention resides also in a flavoring composition comprising a material selected from the group consisting of cocoa-flavored material and chocolate-flavored material and an effective amount of a pyrazine derivative represented by the general formula

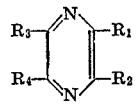

wherein each of $R_1$, $R_2$, $R_3$ and $R_4$ is a member selected from the group consisting of hydrogen and alkyl having 1 to 4 carbon atoms, but both of the side chains adjacent to N do not represent a hydrogen atom at the same time, and a carbonyl compound, such as, vanillin or an aliphatic aldehyde, to improve the flavor of said material.

It is an object of the present invention to improve the flavor of cocoa- and chocolate-flavored material so as to resemble natural flavor more nearly, by utilizing pyrazine derivatives, the use of which has not hitherto been known, in the synthesis of cocoa or chocolate flavors.

During the course of investigation on flavors generated by baking or roasting, the present inventors have studied in regard with the reaction products between amino acid and carbonyl compounds, for instance, such as diacetyl, acetoin, pyruvic acid or the like, contained in various foods and luxury or flavoring items, such as bread, biscuit, roast meat, cocoa, chocolate, coffee, tobacco and others, and found that pyrazine derivatives are produced in accordance with reaction as shown in the following and these pyrazine derivatives act an important role in flavoring.

The pyrazine derivatives are produced according to the following reaction A:

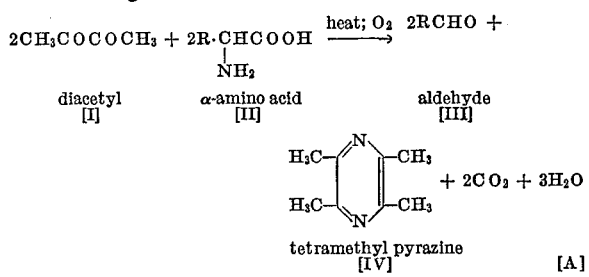

The Equation A represents the reaction between diacetyl I and α-amino acid II, in which case, also a browning reaction known as the Maillard reaction occurs and, as a result, the product becomes brown. Also, as the reaction represented by the Equation A progresses, aldehyde III with one carbon less than that of α-amino acid and tetramethyl pyrazine IV are produced, which produced play an important role in the flavor of baked or roasted food and luxury or flavoring item. It has already been well known that said aldehyde III is also produced by reaction between sugars and amino acid and an important component of flavor of baked or roasted food and luxury or flavoring items. However, the importance or deep significance of pyrazine derivatives, such as, tetramethyl pyrazine has first been taught or ascertained by the present invention. Consequently, according to the present invention there are obtained flavors, which have not hitherto been successfully prepared as in cocoa flavor, and it is possible to produce, for instance, cocoa aroma strikingly resembling natural cocoa aroma by utilizing a methyl pyrazine, such as, tetramethyl pyrazine. Namely, a flavor resembling a natural one can be achieved by the addition of this pyrazine derivative. Furthermore, the present inventors have further studied on the aroma in regard to compounds having a structure similar to that of tetramethyl pyrazine and found that pyrazine derivatives having the following general formula:

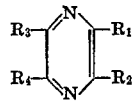

wherein $R_1$, $R_2$, $R_3$ and $R_4$ respectively represent a hydrogen atom or an alkyl radical having 1 to 4 carbon atoms, but both of side chains ($R_1$ and $R_3$ or $R_2$ and $R_4$) adjacent to N do not represent a hydrogen atom at the same time, are capable of being used very effectively for the purpose of the present invention. The pyrazine derivatives are synthesized by well-known synthesis processes. For instance, tetramethyl pyrazine can easily be synthesized by reduction of the mono-oxime of diacetyl. Generally speaking, these pyrazine derivatives possess aroma jointly having burnt smell and sweetness as well as deliciousness. In pyrazine derivatives of which the number of carbon atoms in side chain ranges from 1 to 4, the burnt smell becomes the lower, the higher become the carbon atom number, and aroma having a relationship to the sweetness and deliciousness increases. Nevertheless, no disagreeable odor is sensed as with basic compounds of methylamine, ethylamine, pyridine or the like, which are generally existent as baked or roasted flavor constituents.

The pyrazine derivatives used in the present invention impart a specific aroma note to cocoa and chocolate coffee and others by harmoniously associating with carbonyl compounds, such as vanillin or an aliphatic aldehydes. This can be presumed due to the fact that the tertiary amine forms a kind of Schiff's base with the carbonyl compound and moreover, the bond between tertiary amine and carbonyl compound is not as strong as in compounds with primary or secondary amine compounds. However, according to the present invention, the aldehyde as described above can also be easily used as a flavor constituent and made to approach to natural aroma by incorporating or adding the pyrazine derivatives thereto.

In the present invention, for instance, dimethyl pyrazine, trimethyl pyrazine and, particularly, tetramethyl pyrazine may be used as the pyrazine derivative either alone or in combination. Vanillin and aliphatic aldehydes such as iso-valeraldehyde and isobutyl aldehyde can be used as the carbonyl compound.

This invention is further described in the following examples, which are illustrative but not limitative thereof. Further, in these examples, all parts are by weight, except where otherwise stated.

Example 1

| Cocoa flavor: | Parts |
|---|---|
| Tetramethyl pyrazine | 10 |
| Vanillin | 10 |
| Amylphenyl acetate | 1 |
| Iso-valeraldehyde | 1 |
| Iso-butyl aldehyde | 0.5 |
| Phenyl ethyl alcohol | 0.2 |
| Ethyl acetate | 0.1 |

A mixture obtained by mixing the above described compounds together imparts a flavor resembling natural cocoa to cocoa. The flavor of cocoa-flavored materials can be improved by using this mixture.

Example 2

| | Parts |
|---|---|
| Vanillin | 10 |
| Tetramethyl pyrazine | 10 |

When a crystalline mixture of the above two compounds is added to chocolate at the time of the preparation of cholocate in the same manner as the addition of conventional vanillin to the chocolate, there is obtained chocolate having a stronger delicious aroma than that in single use of vanillin.

What we claim is:

1. A method of improving the flavor of a material selected from the group consisting of vanillin-containing cocoa-flavored material and vanillin-containing chocolate-flavored material, which comprises adding tetramethyl pyrazine to said material in an amount effective to improve its flavor.

References Cited

UNITED STATES PATENTS

| 1,696,419 | 12/1928 | Staudinger | 99—65 |
| 3,154,549 | 10/1964 | Beck | 260—250 |
| 3,328,402 | 6/1967 | Winter | 99—140 X |

OTHER REFERENCES

Chemical Abstracts, vol. 52, 1958, p. 9869a.

Kirk et al.: Encyclopédia of Chemical Technology, 2nd ed., 1964, vol. 5, p. 753 and table 4.

MAURICE W. GREENSTEIN, Primary Examiner